(12) United States Patent
Papakipos et al.

(10) Patent No.: US 9,317,530 B2
(45) Date of Patent: Apr. 19, 2016

(54) FACE RECOGNITION BASED ON SPATIAL AND TEMPORAL PROXIMITY

(75) Inventors: Phaedra Papakipos, Palo Alto, CA (US); Matthew Nicholas Papakipos, Palo Alto, CA (US)

(73) Assignee: Facebook, Inc., Menlo Park, CA (US)

(*) Notice: Subject to any disclaimer, the term of this patent is extended or adjusted under 35 U.S.C. 154(b) by 256 days.

(21) Appl. No.: 13/074,743

(22) Filed: Mar. 29, 2011

(65) Prior Publication Data

US 2012/0250950 A1    Oct. 4, 2012

(51) Int. Cl.
*G06F 17/30* (2006.01)
*G06K 9/00* (2006.01)

(52) U.S. Cl.
CPC .... *G06F 17/30247* (2013.01); *G06F 17/30793* (2013.01); *G06K 9/00677* (2013.01); *G06K 2009/00328* (2013.01)

(58) Field of Classification Search
CPC ............... G06F 17/30247; G06F 17/30793; G06F 17/509; G06K 9/00677; G06K 2009/00328
See application file for complete search history.

(56) References Cited

U.S. PATENT DOCUMENTS

| | | | |
|---|---|---|---|
| 7,519,200 B2 * | 4/2009 | Gokturk et al. | 382/118 |
| 7,606,168 B2 * | 10/2009 | Robinson et al. | 370/254 |
| 7,860,525 B2 * | 12/2010 | Parkkinen et al. | 455/518 |
| 8,631,084 B2 | 1/2014 | Garcia | |
| 8,824,748 B2 | 9/2014 | Tseng | |
| 9,088,757 B2 * | 7/2015 | Curtis | H04N 5/76 |

| | | | |
|---|---|---|---|
| 2006/0018522 A1 | 1/2006 | Sunzeri | |
| 2006/0251292 A1 | 11/2006 | Gokturk et al. | |
| 2007/0098303 A1 | 5/2007 | Gallagher | |
| 2008/0075338 A1 | 3/2008 | Muramatsu | |
| 2008/0152216 A1 * | 6/2008 | Meadow et al. | 382/154 |
| 2008/0195657 A1 | 8/2008 | Naaman | |
| 2008/0270425 A1 | 10/2008 | Cotgreave | |
| 2009/0005987 A1 * | 1/2009 | Vengroff et al. | 701/300 |
| 2009/0036902 A1 * | 2/2009 | DiMaio et al. | 606/130 |
| 2009/0116049 A1 | 5/2009 | Takenuki | |
| 2009/0252383 A1 | 10/2009 | Adam | |
| 2010/0046842 A1 | 2/2010 | Conwell | |
| 2010/0058196 A1 | 3/2010 | Krishnan | |
| 2010/0080420 A1 | 4/2010 | Abe | |
| 2010/0111377 A1 | 5/2010 | Monroe | |
| 2010/0191728 A1 | 7/2010 | Reilly | |
| 2010/0309225 A1 | 12/2010 | Gray et al. | |
| 2010/0318510 A1 | 12/2010 | Ryu | |

(Continued)

FOREIGN PATENT DOCUMENTS

JP   2008-033755   2/2008
KR   10-2007-0115194   12/2007

(Continued)

OTHER PUBLICATIONS

Chi 2006, Apr. 22-27, 2006, Montreal, Quebec, Canada. ACM 1-59593-298-4/06/0004.*

(Continued)

*Primary Examiner* — Manav Seth
(74) *Attorney, Agent, or Firm* — Baker Botts L.L.P.

(57) ABSTRACT

In one embodiment, a social networking system determines one or more individuals matching one or more faces in an image file of a still image or a video sequence, associated with a first user based on the one or more individuals' spatial and temporal proximity to the image file, and presents the matched individuals to the first user.

21 Claims, 8 Drawing Sheets

(56) References Cited

U.S. PATENT DOCUMENTS

| | | | |
|---|---|---|---|
| 2011/0038512 A1 | 2/2011 | Petrou et al. | |
| 2011/0131235 A1 | 6/2011 | Petrou et al. | |
| 2011/0153629 A1* | 6/2011 | Lehmann et al. | 707/758 |
| 2011/0289064 A1* | 11/2011 | Lebeau et al. | 707/706 |
| 2012/0076367 A1 | 3/2012 | Tseng | |
| 2012/0213404 A1* | 8/2012 | Steiner | 382/103 |
| 2012/0250950 A1 | 10/2012 | Papakipos | |
| 2012/0278395 A1 | 11/2012 | Garcia | |
| 2013/0046761 A1 | 2/2013 | Soderberg | |
| 2014/0101275 A1 | 4/2014 | Garcia | |
| 2014/0337341 A1 | 11/2014 | Tseng | |
| 2015/0271222 A1* | 9/2015 | Rao et al. | 709/204 |

FOREIGN PATENT DOCUMENTS

| | | |
|---|---|---|
| WO | 2009/116049 | 9/2009 |
| WO | WO 2009116049 A2 * | 9/2009 |
| WO | WO 2010/078553 | 7/2010 |
| WO | 2011/017653 | 2/2011 |
| WO | WO 2012/134756 | 10/2012 |
| WO | WO 2012/149332 | 11/2012 |

OTHER PUBLICATIONS

O'hare, N.; Smeaton, A.F., "Context-Aware Person Identification in Personal Photo Collections," Multimedia, IEEE Transactions on , vol. 11, No. 2, pp. 220,228, Feb. 2009.*
International Search Report and Written Opinion for International Application PCT/US2012/035471, Nov. 28, 2012.
U.S. Appl. No. 12/890,283, filed Sep. 24, 2010, Tseng.
U.S. Appl. No. 13/097,596, filed Apr. 29, 2011, Garcia.
Office Action for U.S. Appl. No. 12/890,283, Aug. 15, 2012.
International Search Report and Written Opinion for International Application PCT/US2012/028225, Oct. 23, 2012.
Office Action for U.S. Appl. No. 13/097,596, Oct. 16, 2012.
E. Tseng, U.S. Appl. No. 12/890,283, Response to Office Action filed with the U.S. Patent and Trademark Office, Oct. 30, 2012.
E. Tseng, U.S. Appl. No. 12/890,283, Final Office Action from the U.S. Patent and Trademark Office, Dec. 31, 2012.
D. H. Garcia, U.S. Appl. No. 13/097,596, Response to Office Action filed with the U.S. Patent and Trademark Office, Feb. 13, 2013.
E. Tseng, U.S. Appl. No. 12/890,283, *Request for Continued Examination, Response Under 1.114*; Jul. 1, 2013.
D. H. Garcia, U.S. Appl. No. 13/097,596, USPTO Non-final Office Action, May 30, 2013.
E. Tseng, U.S. Appl. No. 12/890,283, USPTO Non Final Office Action dated Aug. 22, 2013.
D. H. Garcia, U.S. Appl. No. 13/097,596, "Response Pursuant to 37 C.F.R.§1.111", filed Aug. 15, 2013.
Erick Tseng, U.S. Appl. No. 12/890,283, Response to Non-Final Office Action filed with U.S. Patent and Trademark Office, Nov. 19, 2013.
Erick Tseng, U.S. Appl. No. 12/890,283, Final Office Action from U.S. Patent and Trademark Office, Dec. 17, 2013.
David H. Garcia, U.S. Appl. No. 13/097,596, Notice of Allowance from U.S. Patent and Trademark Office, Aug. 30, 2013.
Non-Final Office Action for U.S. Appl. No. 14/328,722, Mar. 10, 2015.
Notice of Allowance for U.S. Appl. No. 12/890,283, May 23, 2014.
Response to Final Office Action for U.S. Appl. No. 12/890,283, Mar. 27, 2014.
MX Office Action from Mexican Patent Application No. MX/a/2013/011249 (with English translation), Aug. 12, 2014.
Notification of Reasons for Rejection (Office Action), Japan Patent Office, Patent Application No. 2014-502595 (with English Translation), Feb. 2, 2016.

* cited by examiner

FACE RECOGNITION BASED ON SPATIAL AND TEMPORAL PROXIMITY

TECHNICAL FIELD

The present disclosure relates generally to person identification based on facial recognition and analysis of social network information.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. For example, a user of a social networking website can access an address book stored in the social networking website, look up a contact in the address book and connect with the contact through email.

SUMMARY

Particular embodiments relate to a social networking system that determines one or more individuals matching one or more faces in an image file of a still image or a video sequence, associated with a first user based on the one or more individuals' spatial and temporal proximity. These and other features, aspects, and advantages of the disclosure are described in more detail below in the detailed description and in conjunction with the following figures.

DETAILED DESCRIPTION

Figure 1:
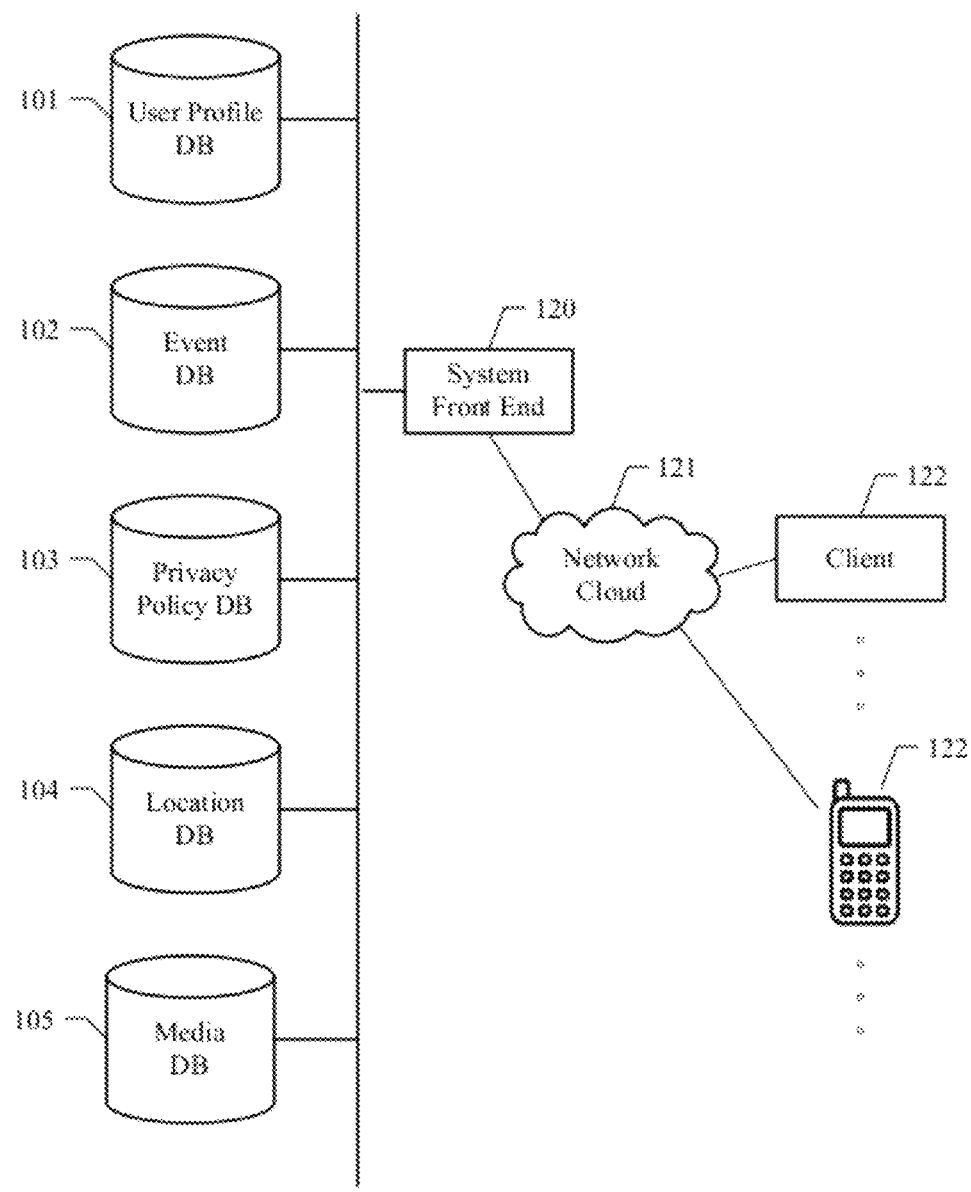
FIG. 1 illustrates an example social networking system.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data.

Social networking system may maintain a database of information relating to geographic locations or places. Places may correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system, as described in U.S. patent application Ser. No. 12/763,171, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. As described below, a user may select a place from a list of existing places near to the user's current location or create a new place. The user may also provide comments in a text string when checking in to a given place. The user may also identify one or more other users in connection with a check-in (such as friends of a user) and associate them with the check-in as well. U.S. patent application Ser. No. 12/574,614, which is incorporated by reference herein for all purposes, describes a system that allows a first user to check-in other users at a given place. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the friends or other social contacts of a user that requests a page corresponding to a place. U.S. application Ser. No. 12/858,718, incorporated by reference in its entirety for all purposes, describes an example geo-social networking system that can be used in connection with various embodiments of the present invention. The check-in activity may also be displayed on a user profile page and in news feeds provided to users of the social networking system.

FIG. 1 illustrates an example social networking system. In particular embodiments, the social networking system may store user profile data and social graph information in user profile database 101. In particular embodiments, the social networking system may store user event data and calendar data in event database 102. In particular embodiments, the social networking system may store user privacy policy data in privacy policy database 103. In particular embodiments, the social networking system may store geographic and location data in location database 104. In particular embodiments, the social networking system may store media data (e.g., photos, or video clips) in media database 105. In particular embodiments, databases 101, 102, 103, 104, and 105 may be operably connected to the social networking system's front end 120. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Mozilla Firefox for Mobile, Apple Safari, Google Chrome, Opera, Opera Mini, and BOLT, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with Wi-Fi and GPS capabilities can be identified by cell tower triangulation, Wi-Fi positioning, and/or GPS positioning.

In particular embodiments, location database 104 may store an information base of places, where each place includes a name, a geographic location and meta information. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, a geographic location of a place with a large area (e.g., Yosemite National Park) can be a shape (e.g., a circle, or a polygon) approximating the boundary of the place and/or a centroid (i.e., geometric center) of the shape. For example, meta information of a place can include information identifying be the user that initially created the place, reviews, ratings, comments, check-in activity data, and the like. Places may be created by administrators of the system and/or created by users of the system. For example, a user may register a new place by accessing a client application to define a place name and provide a geographic location and cause the newly created place to be registered in location database 104. The creating user or other users may access a web page directed to the page and add additional information, such as reviews, comments and ratings for the place. In particular embodiments, location database 104 may store a user's location data. For example, location database 104 may store a user's check-in activities. For example, a user can create a place (e.g., a new restaurant or coffee shop), causing the social networking system to store the user created place in location database 104. For example, a user can create a comment, a review, or a rating of a place, causing the social networking system to store the user's comment, review and rating of the place in location database 104. For example, a special-purpose client application can report and store GPS coordinates of a user's GPS-equipped mobile device to location database 104.

In particular embodiments, a user of the social networking system may upload one or more media files to media database 105. For example, a user can upload a photo or a set of photos (often called a photo album), or a video clip to media database 105 from a client device 122 (e.g., a computer, or a camera phone). In particular embodiments, the one or more media files may contain metadata (often called "tags") associated with each media file. For example, a photo shot by a digital camera may contain metadata relating to file size, resolution, time stamp, name of the camera maker, and/or location (e.g., GPS) coordinates. A user can add additional metadata values to a photo, or tag a photo, during an upload process. Some examples of tags of a media file are author, title, comments, event names, time, location, names of people appearing in the media file, or user comment. In particular embodiments, a user may tag a media file by using a client application (e.g., a photo or video editor), or entering one or more tags in a graphical user interface of a media uploading tool that uploads a user's one or more media files from a client device 122 to the social networking system. A user may also tag a media file after an upload at a later time in the social networking system's web site. In particular embodiments, the social networking system may also extract metadata from a media file and store the metadata in media database 105. A user or a machine can use facial recognition computer software to identify and tag one or more individuals in a media file based on facial images. Particular embodiments herein describe methods of improving facial recognition based on spatial and temporal proximity, and improving user experience in identifying one or more individuals in a media file. Other particular embodiments provide a real-time facial recognition and person identification system that can be used to assist in the identification of individuals and their potential social relationship to a user.

Figure 2:
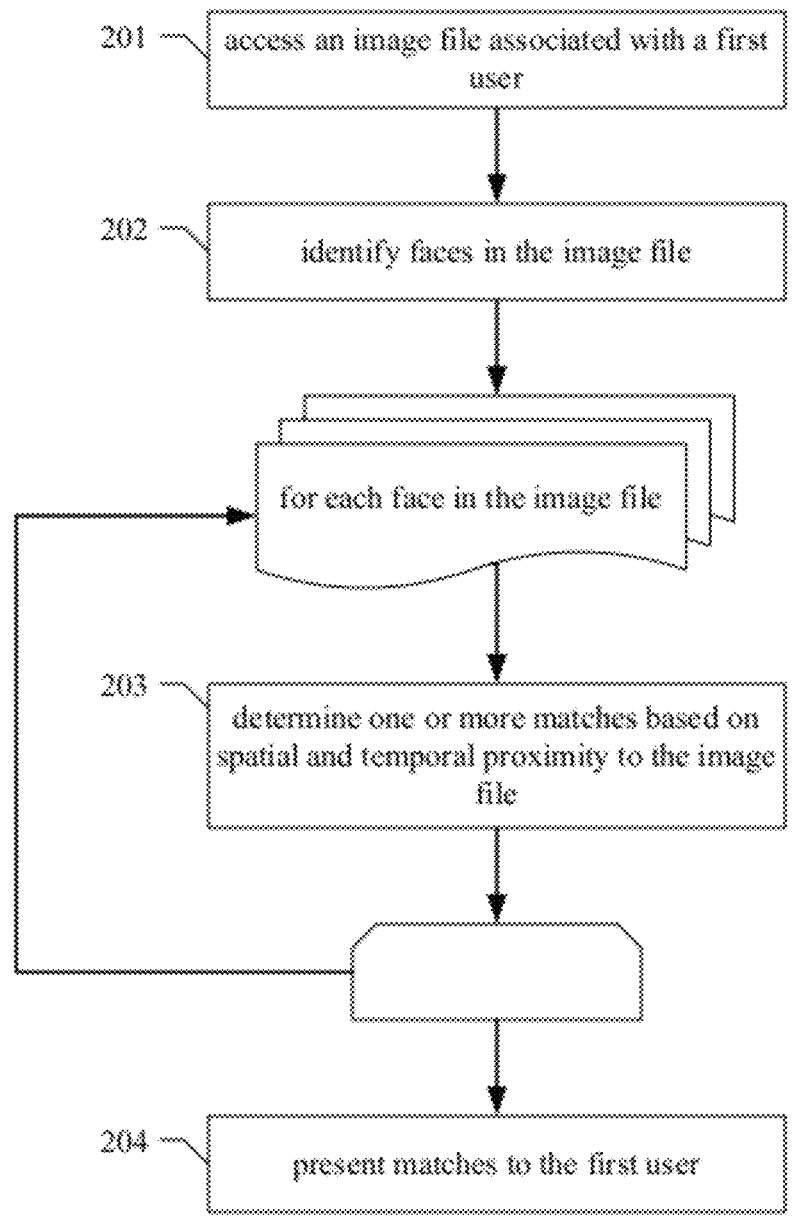
FIG. 2 illustrates an example of person identification process involving facial recognition based on spatial and temporal proximity.

FIG. 2 illustrates an example person identification process involving facial recognition based on spatial and temporal proximity. FIG. 2 can be implemented by a person identification process hosted by one or more computing devices in the social networking system and/or a user's device, such as a mobile phone or laptop. For example, all data sets described herein can be uploaded to a server of the social networking system for processing with the results being sent to a client device. In other implementations, the client device may receive the data and perform the operations described herein. In other implementations, processing may be distributed between client and server. In one particular implementation, the processing described herein can be initiated when a first user accesses a client application that allows the user to capture an image and send the image to a remote person identification process hosted by the social networking system. The person identification process may process the request and return the results to allow the first user to potentially identify (or confirm the identity of) one or more individuals captured in the image in substantially real-time. In particular embodiments, the person identification process may access an image file associated with a first user (201). In particular embodiments, an image file may be a photo with associated metadata. In particular embodiments, an image file may be a video clip with associated metadata. For example, the image file can be a photo or a video clip shot by the first user's client device 122. For example, the image file can be a still or moving image displayed in a viewfinder or a viewfinder user interface of the first user's camera-equipped mobile phone. For example, an image file may be a video clip of a television program recorded by the first user's client device 122, a set-top box or a digital video recorder.

In particular embodiments, the person identification process may identify one or more faces in the image file (202). In particular embodiments, the person identification process may determine a match between a face and a person based on application of a facial recognition or matching algorithm that returns a matching score and comparing the score to a threshold value. For example, facial recognition computer software can calculate a correlation coefficient between a potential match and an identified face, where the correlation coefficient ranges from 0.0 ("no correlation at all") to 1.0 ("perfect match"), and determine a match to the identified face if the correlation coefficient is greater than 0.8. Suitable recognition algorithms include Principal Component Analysis, Linear Discriminate Analysis, Elastic Bunch Graph Matching, Hidden Markov model, and Neuronal Motivated Dynamic Link Matching. In one implementation, the person identification process compares the faces identified in the image file to faces identified in images stored by the social networking system.

In particular embodiments, for each identified face in the image file, the person identification process may create a list of potential matches, or candidates. The person identification process can improve the accuracy and/or speed of facial matching by reducing the size of the list of candidates. For example, the person identification process can reduce the size of the list of candidates by only including candidates that are in the same location as the first user at the same time as the first user created the image file. For example, the list of candidates and the first user can be invitees of the same event (e.g., "Christmas Party 2009"). In some implementations, the list of candidates can also be limited based on degrees of separation between the user uploading the image. For example, the person identification process can limit the pool of candidates to those users separated by no more than two degrees of separation to a user. In particular embodiments, for each identified face, the person identification process may determine one or more matches based on spatial and temporal proximity to the image file (203).

In particular embodiments, the person identification process may determine time and location data associated with the image. In particular embodiments, the person identification process may determine a time stamp of the image file from the image file's metadata. In particular embodiments, the person identification process may determine location data of the image file from the image file's metadata (e.g., GPS or other location coordinates). For real-time applications, the person identification process, in some implementations, may determine location data of the image file by accessing geographic location data (e.g., GPS coordinates) associated with an image upload request, user check-in activity data, and/or event data of the first user, that is concurrent with uploading of the image file and/or in temporal proximity of the meta data of the image file (i.e., in close proximity of or overlapping with the image file's time stamp). For example, the upload request may include GPS data that allows the social networking system to determine a geographic location of the requesting user. In some implementations, the person identification process can access location database 104 to determine location data or check-in activity data of the first user that is concurrent with temporal information associated with the image file. For example, the person identification process can access event database 102 to determine an event (thus location data) of the first user that is concurrent with the image file. In particular embodiments, the person identification process may access the image file's metadata to determine an event data associated with the image file, and determine location data of the image file based on the event data.

In particular embodiments, the person identification process may access one or more data stores to generate a list of candidates comprising users who are in spatial and temporal proximity to the spatio-temporal information associated with the image file. In some implementations, if the person identification process determines that an image file was taken by the first user during an event (e.g., "Christmas Party 2009"), the person identification process can access event database 102 and generate the list of candidates comprising the organizer and participants (invitees or who had RSVP'ed) of the event. For example, the person identification process can access event database 102 and location database 104, and generate the list of candidates comprising users who were, during the time period of the event, within 500 feet the event's location. For example, if an image file of the first user has GPS coordinates of (37° 49'09.15" N, 122° 28'45 11" W) and a time stamp of 3 PM PT, Oct. 9, 2010, the face recognition can access location database 104 and generate the list of candidates comprising users who are within 500 feet of the above GPS coordinates between 2:55 PM and 3:05 PM on Oct. 9, 2010. A candidate's or a user's location can be determined (as described earlier in this application) by the user's check-in activities and/or by the user's location data captured by the user's GPS-equipped mobile device that are stored in location database 104.

Additionally, the person identification process can further reduce the size of the list of candidates by only including candidates that are within a threshold social proximity to the first user. In one embodiment, for each identified face, the list of candidates is limited to a set of users that are first degree contacts of the first user. In other embodiments, for each identified face, the list of candidates is limited to a set of users that are first and second degree contacts of the first user. For example, if an image file of the first user has GPS coordinates of (37° 49'09.15" N, 122° 28'45 11" W) and a time stamp of 3 PM PT, Oct. 9, 2010, the face recognition can access user profile database 101, and location database 104, and generate the list of candidates comprising the first user's first-degree and second-degree contacts, who are also within 500 feet of the above GPS coordinates between 2:55 PM and 3:05 PM on Oct. 9, 2010. As the foregoing illustrates, policies can be configured to require additional matching attributes, such as spatio temporal proximity, as the social graph is traversed beyond first degree contacts.

In particular embodiments, for each identified face, the person identification process may determine one or more matches based on the list of candidates comprising users who are within threshold spatial and temporal proximity to the metadata associated with the image file. In other embodiments, for each identified face, the person identification process may determine one or more matches based on the list of candidates comprising users who are in spatial and temporal proximity to the metadata associated with the image file, and are in social proximity to the first user that uploaded the image file. For example, for each identified face, the person identification process can use facial recognition computer software to compute a correlation coefficient between the identified face and each of the list of candidates comprising users who are in spatial and temporal proximity to the image file. In one implementation, the facial recognition computer software may access one or more of profile pictures or other pictures associated with the candidate users for the comparison. In one implementation, the person identification process determines that a candidate is a match to the identified face if the correlation coefficient is greater than 0.8. In some implementations, where the matching yields more than one potential match, the person identification process may select the highest scoring match or present both matches to the user. In particular embodiments, the person identification process may present the one or more matches in the image file to the first user (204).

Figure 3:
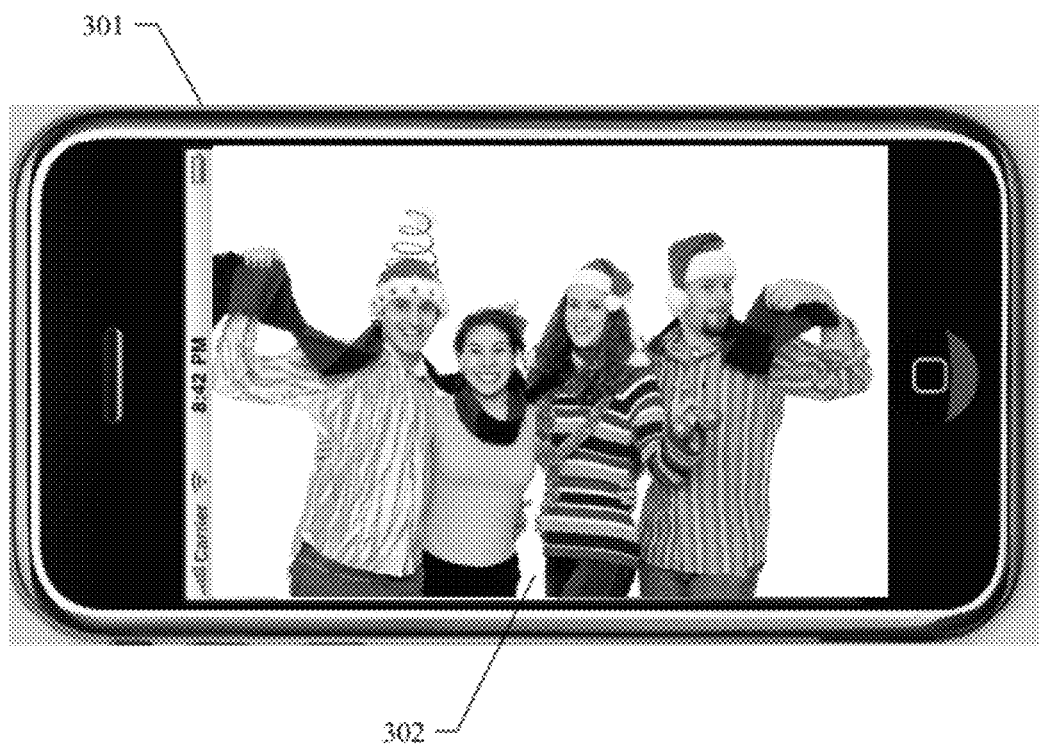
FIG. 3 illustrates an example of an image including a set of individuals displayed by a mobile phone.

FIG. 3 illustrates an example of an image including a set of individuals displayed by a mobile phone. For example, the image 302 can be a picture taken by a first user with the first user's mobile phone 301, at an event "Christmas Party 2009." For example, the image 302 can be a still or moving image displayed in a viewfinder user interface hosted by the first user's mobile phone as the first user activates the camera function of the mobile phone at the event "Christmas Party 2009." The person identification process can access the image 302 stored in mobile phone 301, or in media database 105 (if the image had been uploaded media database 105), identified one or more faces in the image 302, and determine one or more users matching each of the one or more identified faces based on spatial and temporal proximity, as illustrated by FIG. 2. In one implementation, the user may send a real-time request to the social networking system in order to receive information regarding one or more of the people captured in the subject image.

Figure 4:
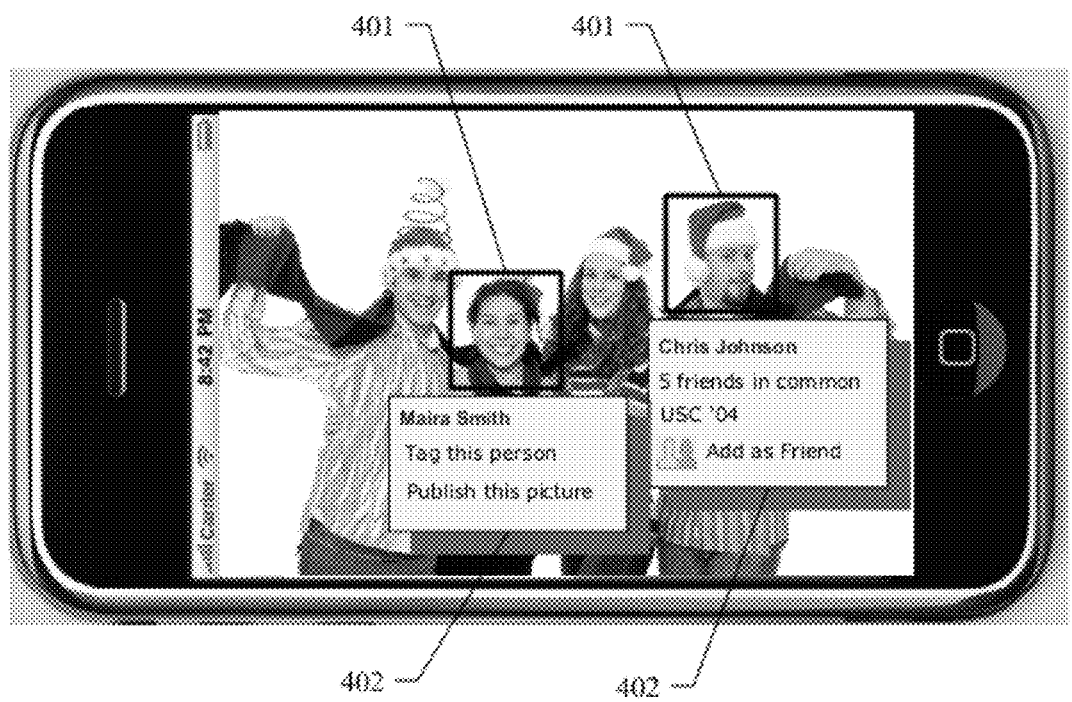
FIG. 4 illustrates an example of user interface that presents matching users in an image file.
Figure 4A:
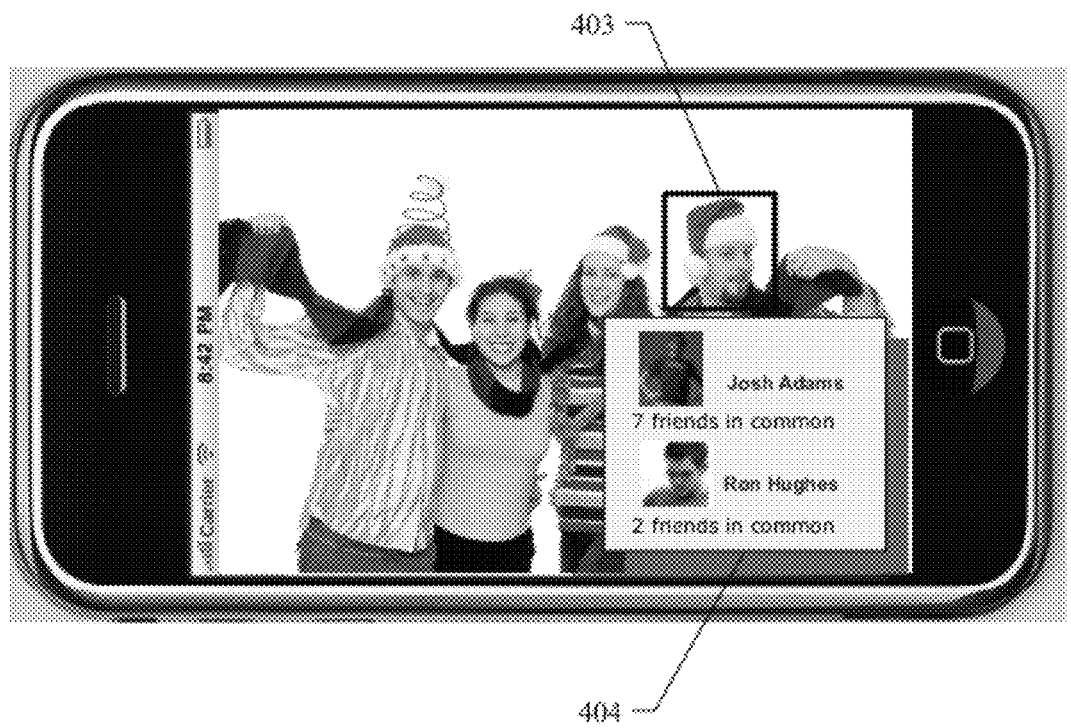
FIG. 4A illustrates an example of user interface presenting more than one match of an identified face in an image file.

FIG. 4 illustrates an example user interface that presents matching users in an image file. A user may for example use a client application hosted on a mobile device that uploads a captured image in connection with a real-time identification request to the social networking system. The response allows a user to see the name (and possible other information—such as relationship status information) of one or more users in case the user is having trouble remembering the name of a subject user captured in the image. In other implementations, the first user may capture an image as part of a check-in process flow and use the person identification functionality to check-in other users captured and identified within the image. In particular embodiments, the person identification process may access one or more data stores and present information associated with a matching user, or a user matching an identified face. In particular embodiments, the person identification process may present information associated with a matching user in a frame overlapping the image file. For example in FIG. 4, the person identification process can present a box (401) identifying a matched face, and present information associated with a matching user in a frame overlaying the picture (402). For example, the person identification process can access user profile database 101, and present user profile information (e.g., a name, a profile picture), social graph information (e.g. "5 friends in common"), and/or affiliation information (e.g., "USC '05") for the matching user. In particular embodiments, the frame displaying information associated with a matching user may comprise one or more selectable icons. For example, an icon can be a text string, a picture or a graphical icon. For example, the first user can select an icon to cause the person identification process to tag the matching user to the picture, or to send an friend invitation to the matching user. In particular embodiments, the person identification process may present an option to store the image file in the social networking system. For example, the person identification process can present a selectable text string "Publish this picture", when selected, causing the person identification process to store the image file in media database 105 and publish the image file to the first user's profile page. FIG. 4A illustrates an example user interface presenting more than one match of an identified face in an image file. In the example of FIG. 4A, the person identification process can display a box (403) for an identified face, and a frame (404) comprising two matching users, and related user profile information (e.g., a name, a profile picture) and social graph information (e.g., "7 friends in common"). For example, the first user can select one of the two matches (e.g., by tapping on a name or a profile picture) to confirm a match.

A variety of implementations are possible. For the example of a video clip of a television program recorded by the first user's client device 122, a set-top box or a digital video recorder, the person identification process can reduce the size of the list of candidates by limiting consideration to actors who are in one or more television programs that are in temporal and/or spatial proximity to the video clip. In particular embodiments, the person identification process may determine time and location data of the video clip. For example, the person identification process can determine time and/or location data of the video clip from the video clip's metadata. For example, the person identification process can determine a time stamp of the video clip. For example, the person identification process can determine a location data of the video clip based on location data of the client device 122 (e.g., a GPS-equipped mobile phone) or the set-top box (e.g., a set-top box for a particular television market by a particular cable or satellite television programming provider). In particular embodiments, the person identification process may access a data store of television programming (e.g., Gemstar TV Guide) and identify one or more television programs that are concurrently transmitted to viewers in the same geographic location (e.g., New York City) as the video clip. In other embodiments, the person identification process may apply an audio-matching program to identify one or more television programs associated with the video clip based on audio portion of the video clip. In particular embodiments, the person identification process may access one or more data stores and generate a list of candidates comprising actors in the one or more television programs. In particular embodiments, for each identified face in the video clip, the person identification process may determine one or more facial matches in the image file based on the list of candidates. In particular embodiments, the person identification process may present the one or more matches in the image file to the first user. For example, the person identification process can present to the first user a name a link to a fan page of a matched actor in a frame overlaying the video clip. In other embodiments, the person identification process may publish on the first user's wall post of the social networking system, indicating one or more television programs that the first user is watching. In some embodiments, the person identification process may deliver targeted advertisement to the first user based on the one or more television programs that the first user is watching.

Figure 5:
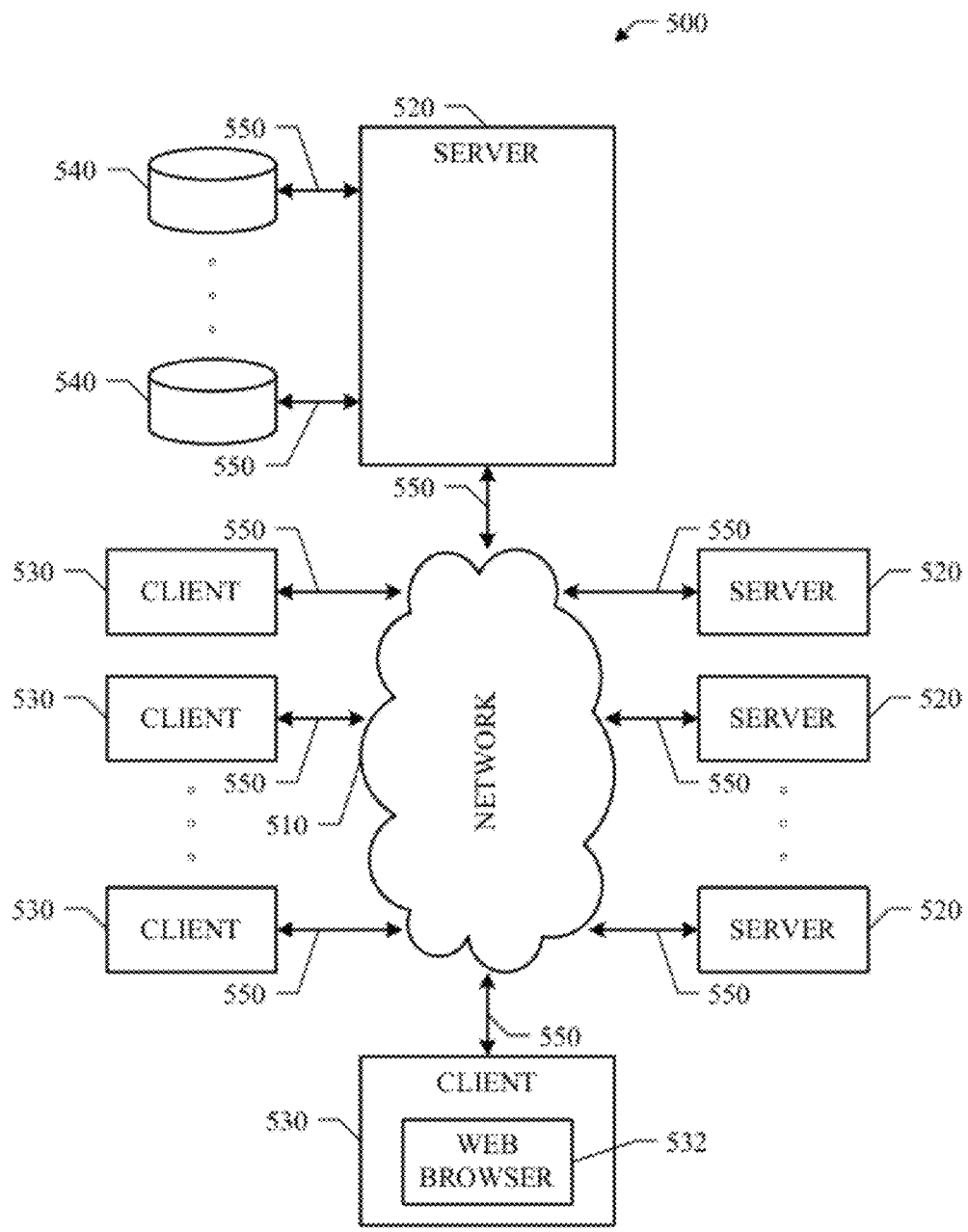
FIG. 5 illustrates an example network environment.

While the foregoing embodiments may be implemented in a variety of network configurations, the following illustrates an example network environment for didactic, and not limiting, purposes. FIG. 5 illustrates an example network environment 500. Network environment 500 includes a network 510 coupling one or more servers 520 and one or more clients 530 to each other. Network environment 500 also includes one or more data storage 540 linked to one or more servers 520. Particular embodiments may be implemented in network environment 500. For example, social networking system frontend 120 may be written in software programs hosted by one or more servers 520. For example, event database 102 may be stored in one or more storage 540. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wired, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more servers 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functions implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVA-SCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
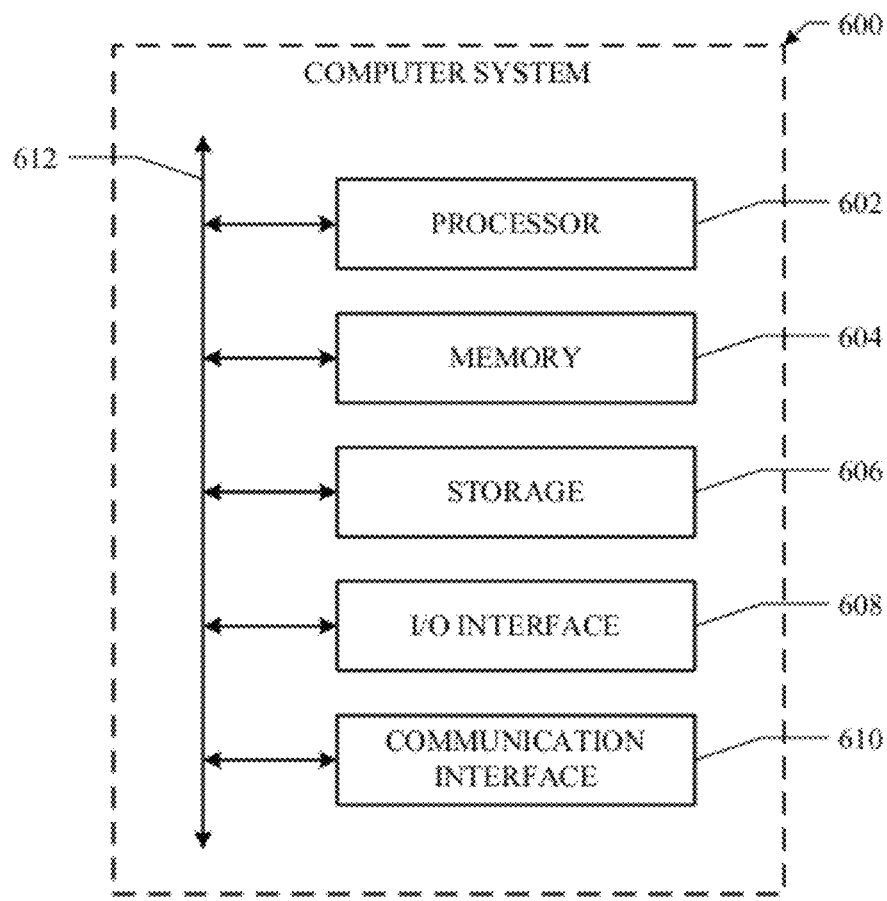
FIG. 6 illustrates an example computer system.

FIG. 6 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation look-aside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 602, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network (such as, for example, a 802.11a/b/g/n WI-FI network, a 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, a Long Term Evolution (LTE) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit (I2C) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, a Advanced Microcontroller Bus Architecture (AMBA) bus, or another suitable bus or a combination of two or more of these. Bus 612 may include one or more buses 612, where appropriate. Although this disclosure describes and illustrates a particular bus, this disclosure contemplates any suitable bus or interconnect.

Figure 7:
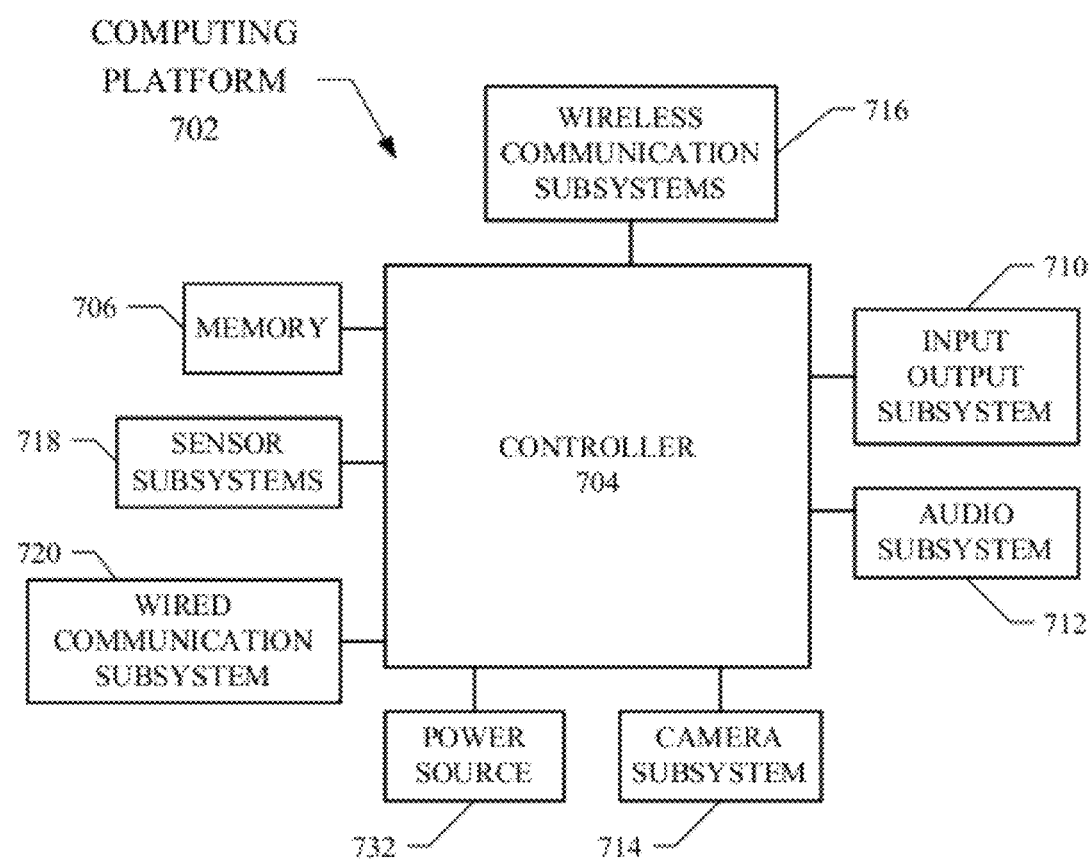
FIG. 7 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 7 shows a schematic representation of the main components of an example computing platform of a client or mobile device, according to various particular embodiments. In particular embodiments, computing platform 702 may comprise controller 704, memory 706, and input output subsystem 710. In particular embodiments, controller 704 which may comprise one or more processors and/or one or more microcontrollers configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702. By way of example, controller 704 may include one or more processors or one or more controllers dedicated for certain processing tasks of computing platform 702, for example, for 2D/3D graphics processing, image processing, or video processing.

Controller 704 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 706 that is operatively coupled to controller 704.

Memory 706 may encompass one or more storage media and generally provide a place to store computer code (e.g., software and/or firmware) and data that are used by computing platform 702. By way of example, memory 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory 706 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to controller 704. Information may also reside on one or more removable storage media loaded into or installed in computing platform 702 when needed. By way of example, any of a number of suitable memory cards (e.g., SD cards) may be loaded into computing platform 702 on a temporary or permanent basis.

Input output subsystem 710 may comprise one or more input and output devices operably connected to controller 704. For example, input output subsystem may include keyboard, mouse, one or more buttons, thumb wheel, and/or, display (e.g., liquid crystal display (LCD), light emitting diode (LED), Interferometric modulator display (IMOD), or any other suitable display technology). Generally, input devices are configured to transfer data, commands and responses from the outside world into computing platform 702. The display is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 710 may also include touch based devices such as touch pad and touch screen. A touchpad is an input device including a surface that detects touch-based inputs of users. Similarly, a touch screen is a display that detects the presence and location of user touch inputs. Input output system 710 may also include dual touch or multi-touch displays or touch pads that can identify the presence, location and movement of more than one touch inputs, such as two or three finger touches.

In particular embodiments, computing platform 702 may additionally comprise audio subsystem 712, camera subsystem 712, wireless communication subsystem 716, sensor subsystems 718, and/or wired communication subsystem 720, operably connected to controller 704 to facilitate various functions of computing platform 702. For example, Audio subsystem 712, including a speaker, a microphone, and a codec module configured to process audio signals, can be utilized to facilitate voice-enabled functions, such as voice recognition, voice replication, digital recording, and telephony functions. For example, camera subsystem 712, including an optical sensor (e.g., a charged coupled device (CCD), or a complementary metal-oxide semiconductor (CMOS) image sensor), can be utilized to facilitate camera functions, such as recording photographs and video clips. For example, wired communication subsystem 720 can include a Universal Serial Bus (USB) port for file transferring, or a Ethernet port for connection to a local area network (LAN).

Wireless communication subsystem 716 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). Additionally, wireless communication subsystem 716 may include hosting protocols such that computing platform 702 may be configured as a base station for other wireless devices.

Sensor subsystem 718 may include one or more sensor devices to provide additional input and facilitate multiple functionalities of computing platform 702. For example, sensor subsystems 718 may include GPS sensor for location positioning, altimeter for altitude positioning, motion sensor for determining orientation of a mobile device, light sensor for photographing function with camera subsystem 714, temperature sensor for measuring ambient temperature, and/or biometric sensor for security application (e.g., fingerprint reader).

In particular embodiments, various components of computing platform 702 may be operably connected together by one or more buses (including hardware and/or software). As an example and not by way of limitation, the one or more buses may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit (I2C) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these. Additionally, computing platform 702 may be powered by power source 732.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a MultiMediaCard (MMC) card, an embedded MMC (eMMC) card, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, JavaScript, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
   by one or more computing devices, accessing an image file associated with a first user;
   by one or more computing devices, detecting a face in an image corresponding to the image file;
   by one or more computing devices, accessing a social-networking system associated with the first user and a plurality of second users, wherein:
   the social-networking system comprises a graph that comprises a plurality of nodes and edges connecting the nodes;
   at least one of the nodes corresponds to the first user; and
   for each of the second users, at least one of the nodes corresponds to the second user; and
   by one or more computing devices, determining one or more candidates among the second users to be matched to the face, wherein the determination is based at least in part on:
   a comparison of temporal and spatial proximity of the second users, as indicated by the social-networking system, to a time and place associated with the image with a threshold temporal and spatial proximity; and
   a comparison of degrees of separation between the second users and the first user indicated by the social-networking system with a threshold degrees of separation.

2. The method of claim 1, further comprising presenting the candidates to the first user for the first user to match to the face.

3. The method of claim 1, wherein determining one or more candidates among the second users to be matched to the face is further based on application of a facial-recognition algorithm to the face.

4. The method of claim 2, wherein presenting the candidates to the first user for the first user to match to the face comprises:
- accessing one or more data stores for information associated with one or more of the candidates;
- generating one or more frames comprising information associated with the one or more of the candidates; and
- displaying one or more of the frames at least partially overlying the image.

5. The method of claim 4, wherein one or more of the frames comprises one or more selectable icons.

6. The method of claim 1, wherein the image file comprises:
- a photograph and associated metadata in digital form; or
- a video and associated metadata in digital form.

7. The method of claim 3, wherein determining one or more candidates among the second users to be matched to the face comprises:
- identifying a subset of the second users based on:
  - a comparison of temporal and spatial proximity of the second users, as indicated by the social-networking system, to the time and place associated with the image with a threshold temporal and spatial proximity; and
  - a comparison of degrees of separation between the second users and the first user indicated by the social-networking system with a threshold degrees of separation; and
- by the facial-recognition algorithm, comparing the face in the image with faces of the second users in the subset.

8. A system comprising:
- one or more processors; and
- a memory coupled to the processors comprising instructions executable by the processors, wherein the processors are operable when executing the instructions to:
  - access an image file associated with a first user;
  - detect a face in an image corresponding to the image file;
  - access a social-networking system associated with the first user and a plurality of second users, wherein:
    - the social-networking system comprises a graph that comprises a plurality of nodes and edges connecting the nodes;
    - at least one of the nodes corresponds to the first user; and
    - for each of the second users, at least one of the nodes corresponds to the second user; and
  - determine one or more candidates among the second users to be matched to the face, wherein the determination is based at least in part on:
    - a comparison of temporal and spatial proximity of the second users, as indicated by the social-networking system, to a time and place associated with the image with a threshold temporal and spatial proximity; and
    - a comparison of degrees of separation between the second users and the first user indicated by the social-networking system with a threshold degrees of separation.

9. The system of claim 8, wherein the processors are further operable when executing the instructions to present the candidates to the first user for the first user to match to the face.

10. The system of claim 8, wherein determining one or more candidates among the second users to be matched to the face is further based on application of a facial-recognition algorithm to the face.

11. The system of claim 9, wherein presenting the candidates to the first user for the first user to match to the face comprises:
- accessing one or more data stores for information associated with one or more of the candidates;
- generating one or more frames comprising information associated with the one or more of the candidates; and
- displaying one or more of the frames at least partially overlying the image.

12. The system of claim 11, wherein one or more of the frames comprises one or more selectable icons.

13. The system of claim 8, wherein the image file comprises:
- a photograph and associated metadata in digital form; or
- a video and associated metadata in digital form.

14. The system of claim 10, wherein determining one or more candidates among the second users to be matched to the face comprises:
- identifying a subset of the second users based on:
  - a comparison of temporal and spatial proximity of the second users, as indicated by the social-networking system, to the time and place associated with the image with a threshold temporal and spatial proximity; and
  - a comparison of degrees of separation between the second users and the first user indicated by the social-networking system with a threshold degrees of separation; and
- by the facial-recognition algorithm, comparing the face in the image with faces of the second users in the subset.

15. One or more non-transitory computer-readable storage media embodying software that is operable when executed to:
- access an image file associated with a first user;
- detect a face in an image corresponding to the image file;
- access a social-networking system associated with the first user and a plurality of second users, wherein:
  - the social-networking system comprises a graph that comprises a plurality of nodes and edges connecting the nodes;
  - at least one of the nodes corresponds to the first user; and
  - for each of the second users, at least one of the nodes corresponds to the second user; and
- determine one or more candidates among the second users to be matched to the face, wherein the determination is based at least in part on:
  - a comparison of temporal and spatial proximity of the second users, as indicated by the social-networking system, to a time and place associated with the image with a threshold temporal and spatial proximity; and
  - a comparison of degrees of separation between the second users and the first user indicated by the social-networking system with a threshold degrees of separation.

16. The media of claim 15, wherein the software is further operable when executed to present the candidates to the first user for the first user to match to the face.

17. The media of claim 15, wherein determining one or more candidates among the second users to be matched to the face is further based on application of a facial-recognition algorithm to the face.

18. The media of claim 16, wherein presenting the candidates to the first user for the first user to match to the face comprises:
- accessing one or more data stores for information associated with one or more of the candidates;
- generating one or more frames comprising information associated with the one or more of the candidates; and
- displaying one or more of the frames at least partially overlying the image.

19. The media of claim 18, wherein one or more of the frames comprises one or more selectable icons.

20. The media of claim 17, wherein determining one or more candidates among the second users to be matched to the face comprises:
- identifying a subset of the second users based on:
  - a comparison of temporal and spatial proximity of the second users, as indicated by the social-networking system, to the time and place associated with the image with a threshold temporal and spatial proximity; and
  - a comparison of degrees of separation between the second users and the first user indicated by the social-networking system with a threshold degrees of separation; and
- by the facial-recognition algorithm, comparing the face in the image with faces of the second users in the subset.

21. The media of claim 15, wherein the image file comprises:
- a photograph and associated metadata in digital form; or
- a video and associated metadata in digital form.

* * * * *